Patented Oct. 3, 1922.

1,430,725

UNITED STATES PATENT OFFICE.

ALEXANDER L. DUVAL D'ADRIAN, OF WASHINGTON, PENNSYLVANIA.

PROCESS OF AND MIXTURE FOR MAKING GLASS.

No Drawing.   Application filed July 21, 1921.   Serial No. 486,582.

*To all whom it may concern:*

Be it known that I, ALEXANDER L. DUVAL D'ADRIAN, a citizen of the United States, residing at Washington, in the county of Washington and State of Pennsylvania, have invented certain new and useful Improvements in Processes of and Mixtures for Making Glass, of which the following is a specification.

My invention relates to improvements in, process of and mixtures for making glass.

An important object of the invention is to provide means of the above mentioned character adapted to improve the color of the glass.

It is well known that the iron inherently present in the materials ordinarily used for making glass, imparts a greenish color to the glass.

I have found that this greenish color can be wholly or partly eliminated by the addition to the usual glass mixture of a compound of bromine, such as a bromine salt, capable of acting as an oxidizing agent at the high temperature at which the glass mixture is heated to melt. Such bromine compounds or salts may be magnesium bromide, sodium bromate, etc.

As a specific illustration of the ingredients employed in producing my improved glass, the same may be given as follows:

Sand _____ 1,000 lbs.
Soda ash _____ 360 to 380 lbs.
Limestone _____ 200 to 220 lbs.
Magnesium bromide_____ ½ to 50 lbs.

The above ingredients are of course thoroughly mixed and heated in the usual manner so that the mass fuses, to produce the glass. On raising the mixture to the temperature of fusing, the magnesium bromide partially changes the iron present in the mixture to iron bromide. This iron bromide is volatile at the temperature of the fusion, and passes away from the mixture in the form of a gas. The magnesium bromide also partially oxidizes a portion or the remaining portion of the iron present, and this oxidized iron does not impart a greenish color to the glass.

The amount of bromine compound or bromine salt employed is varied materially depending upon the nature of the bromide compound used, and the condition of the glass-forming materials, to the results desired. Satisfactory results have been obtained by employing from one-half to fifty pounds of magnesium bromide, or sodium bromate, in combination with the other ingredients above stated.

It is to be understood that the form of my invention herewith shown and described is to be taken as a preferred example of the same, and that various changes may be resorted to in the order of the steps of the process, and chemical equivalents employed, without departing from the spirit of my invention or the scope of the subjoined claims.

Having thus described my invention, I claim:

1. The herein described process of producing glass which is substantially free from the greenish color imparted thereto by the iron present in the usual glass mixture, which consists in adding to the usual glass mixture a bromine compound capable of acting as an oxidizing agent at the high fusing temperature of the glass mixture and heating the mass to the fusing point.

2. The herein described process of producing glass which is substantially free from the greenish color imparted thereto by the iron present in the usual glass mixture which consists in adding to the usual glass mixture a bromine salt capable of acting as an oxidizing agent at the high fusing temperature of the glass mixture, and heating the mass to the fusing point.

3. The herein described process of producing glass which is substantially free from the greenish color imparted thereto by the iron present in the usual glass mixture, which consists in adding to the usual glass mixture a bromine salt of an alkaline earth metal, and heating the mass to the fusing point.

4. A mixture for producing glass, comprising the usual glass composition, and a bromine compound.

5. A mixture for producing glass, comprising the usual glass composition, and a bromine salt.

In testimony whereof I affix my signature.

ALEXANDER L. DUVAL d'ADRIAN.